Figure 1:
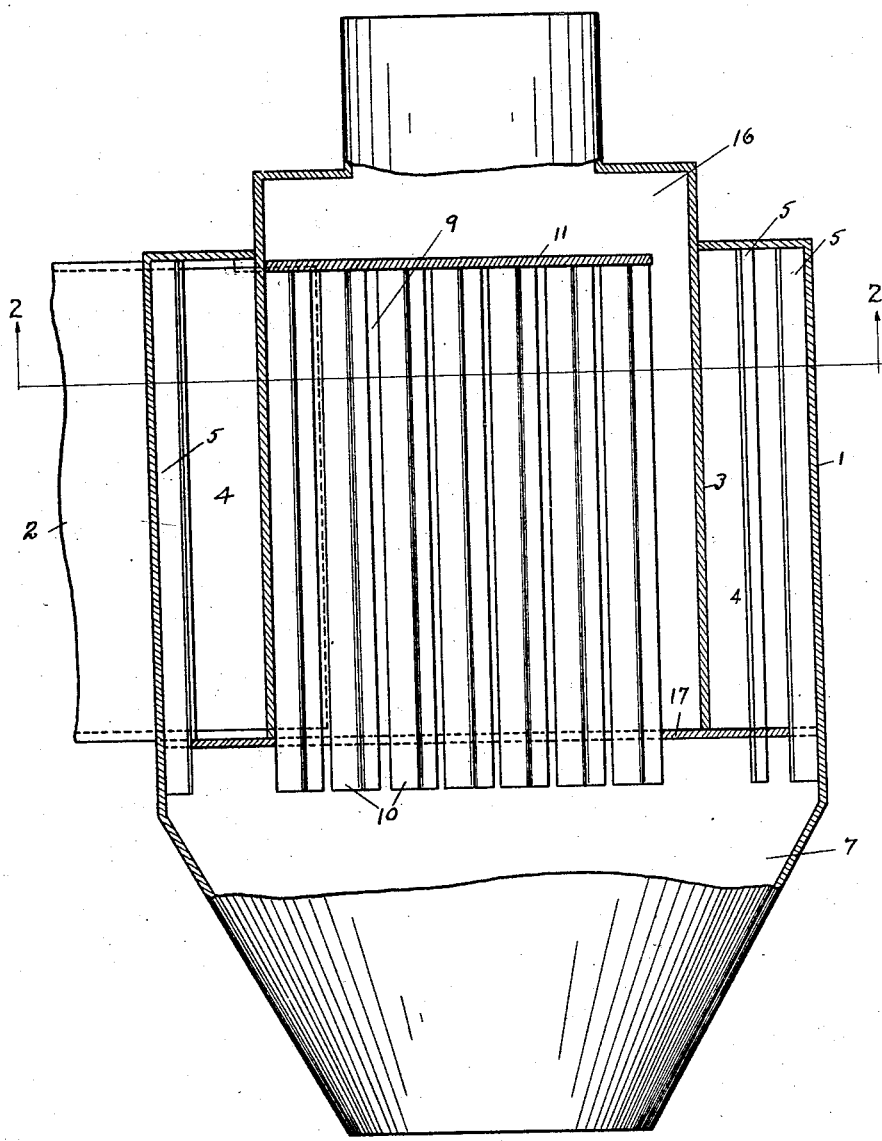

INVENTOR
Harry B. Meller and Stehman A. Bockius
by William B. Wharton
their attorney Jan. 27, 1931.          H. B. MELLER ET AL          1,790,481
                        DUST AND SOOT SEPARATOR
                        Filed July 14, 1927    2 Sheets-Sheet 2
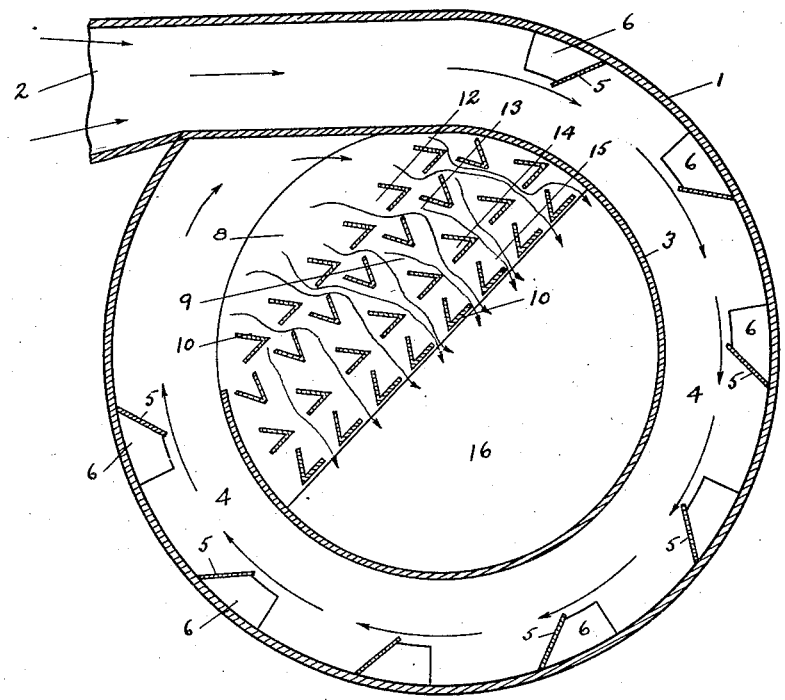
FIG. 2
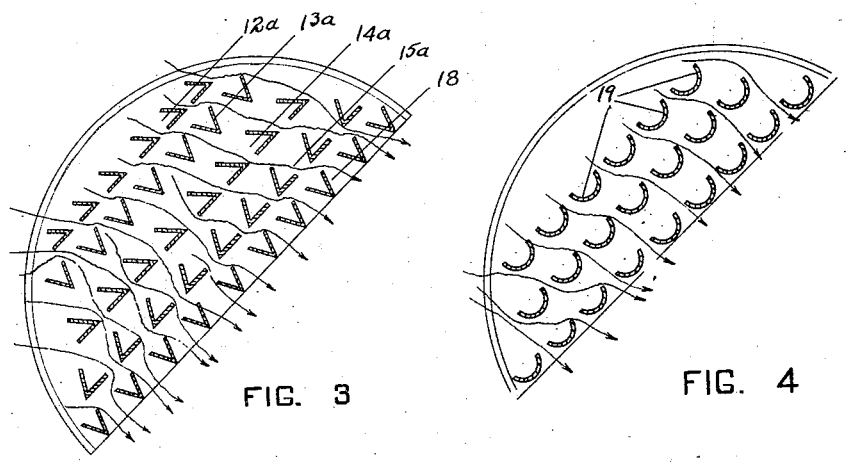
FIG. 3                                  FIG. 4
INVENTOR
Harry B. Meller and Stehman A. Bockius
by William B. Wharton
their attorney Patented Jan. 27, 1931

1,790,481

UNITED STATES PATENT OFFICE

HARRY B. MELLER AND STEHMAN A. BOCKIUS, OF PITTSBURGH, PENNSYLVANIA

DUST AND SOOT SEPARATOR

Application filed July 14, 1927. Serial No. 205,543.

This invention relates to a dust and soot separator, which is designed primarily for insertion in the flue between a furnace and a smoke stack for removing the solid constituents of the smoke, but which may be used in various other connections.

For the removal of solid particles, such as the carbon black of smoke and dust of various sorts, it is possible to precipitate the particles by providing areas of relative quiet, so that the particles entrained by the carrying gases may be checked and permitted to settle. In utilizing such method, which is for many purposes the most desirable, it is also important to remove the particles from the gas stream immediately on their precipitation, so that they may not be again entrained and carried along.

While it is obviously possible to permit the settling of dust and soot by discharging the same into a settling chamber of relatively great area, this is for many purposes impractical. In many such connections it is necessary to provide a separator which occupies a relatively small area, and also in many connections to provide a separator which operates at relatively low power.

Where the dust and soot separator is used in conjunction with a furnace it is desirable that the separator be of such form and arrangement as to produce a minimum draft reduction, and it is also desirable that the separator operate efficiently under various draft conditions in the furnace, with consequent variation in the speed and volume of gases passing through the separator.

One object of the invention is to provide a baffle element so formed that it produces, when interposed in the gas stream, an area of quiet capable of permitting the precipitation of particles entrained by the gas stream.

Another object of the invention is to so arrange a baffle or baffles of this nature in a dust and soot separator that the precipitated particles are immediately removed from the zone of gas flow into an area of permanent quiet.

Another object of the invention is to provide a dust and soot separator which does not materially detract from the draft through a furnace and stack, and which operates efficiently with variations in such draft.

A still further object of the invention is to provide a dust and soot separator which is compact, simple, and which may be readily cleansed of the accumulation of material collected therein.

In the accompanying drawings Figure 1 is a central vertical sectional view; Figure 2 is a horizontal section, taken on the line 2—2 of Fig. 1; Figure 3 is a horizontal section through a nest of the final baffle elements, which is slightly modified over the nest of such elements shown in Fig. 2; and Figure 4 is a similar view of a still further modification in the nest of final baffle elements.

In the drawings the reference numeral 1 designates the main or outer casing of the device, which has therein an inlet opening 2 for attachment in the flue of a furnace, or other source of air, or other gas, having solid particles entrained therewith. Within the outer casing 1 is a curved wall 3, which together with the outer casing provides a curved passage 4. Extending inwardly from the outer casing 1, and each forming an angle less than a right angle therewith, are a plurality of baffle members 5. As the gases pass through the duct or passage 4 approximately in the path indicated by the arrows therein, solid particles are thrown outwardly toward the inner surface of the main casing 1, and into the pockets or quiet areas formed by the baffles 5. It should be noted that the baffles both decrease the effective area of the passage 4, and also cause areas of relative quiet adjacent the interior surface of the main casing. The solid particles thrown outwardly into the quiet areas formed by these baffles, are not therefore picked up and carried along after their deposition, but tend to fall through apertures 6, adjacent the baffles into the collecting and discharge portion 7 of the separator. As the chamber of the collecting and discharge portion 7 provides an area of permanent quiet, the deposited particles are not again entrained, but remain in the chamber until discharged therefrom.

From the passage 4 the gas passes out through an aperture 8 in the inner wall 3, and traverses a nest 9 of additional suitably arranged baffles. This baffle nest 9 comprises a plurality of angular baffle members 10, which are attached at their upper extremities to a plate 11. The nest is, however, provided with no floor, or lower plate, so that it opens downwardly into the collecting and discharge portion 7 of the separator.

It will be noted that each of the baffle members 10 comprises two legs which form with each other an interior angle of less than ninety degrees. As shown in Figure 2 of the drawings, the nest 9 comprises four rows 12, 13, 14, and 15 of the baffle elements 10. The baffle elements 10 of the several rows are so staggered with respect to the elements of other rows that there is no appreciable direct line of gas flow through the nest, the gas coming into contact successively with the baffle elements of the successive rows or entering the quiet areas formed by the pockets thereof.

Gas entering the baffle nest thus enters the pockets formed by the baffle elements of the row 12, and due to the area of relative quiet formed by these baffles loses entrained solids which are precipitated into the chamber 7. Other portions of the gas stream enter the pockets formed by the baffle elements of the row 13, and solids are also precipitated from this row into the collecting chamber. This action continues throughout the entire extent of the baffle nest to produce a continued precipitation of particles. The number of rows provided depends upon the use to which the separator is to be put, and the total percentage of separation which is desired. A greater or lesser number of rows may therefore be employed without otherwise altering the structure of the baffles, or of the separator as a whole.

It may be noted that the total effective area between the baffle elements 10 of any row is slightly greater than the effective area in the passage 4. Under some conditions the slight decrease in the velocity of gases thus produced is desirable in facilitating the deposition of entrained particles. It should be understood, however, that under certain conditions of use it may be desirable to provide an effective area for gas passage in each baffle row which is equal to or greater than the effective area in the passage 4.

After passing through the baffle nest 9, the gas stream enters flue chamber 16, from which it passes to the stack or other outlet. The relatively abrupt decrease in the velocity of flow as the gases enter this chamber, tends to cause the deposition of the last remaining and finest particles carried by the gases, which are precipitated to the floor 17 of the chamber. As such particles may be again picked up it may be desirable to provide a thin coating of suitable adhesive material on this floor 17.

Figure 3 of the drawings illustrates a baffle nest in which baffle members of form similar to those previously described are also similarly arranged. This modified form of nest, however, comprises an additional row 18 of baffle elements as well as the four rows 12a, 13a, 14a, and 15a corresponding to the four rows of baffle elements shown in Figure 2. This final row of baffle elements provides an additional precaution against the continued entrainment of the particles which may be less readily separated from the gas stream during its passage through the preceding elements of the separator.

Figure 4 of the drawings shows a baffle nest comprising staggered rows of baffle elements 19, which are curved in cross section, and have the pockets formed thereby presented counter to the general direction of flow of the gas stream. The pocket baffles previously described provide their pockets by means of two legs meeting to form an interior angle of less than ninety degrees which has been found to be the most efficient under certain conditions of use. It should be understood, however, that the pockets, producing the quiet area effect may be obtained by means of baffles whose legs meet at a greater angle, by the curved baffles as shown in Figure 4 of the drawings, or by any other form of baffle providing a pocket to produce an area of quiet.

It should be understood that not only the number of rows of baffle elements 10 comprised in the baffle nest 9 may be varied, but that the number of baffle elements 5 in the gas passage 4 may also be varied. Either of these variations depends upon the conditions of use of the separator, and may be determined for standardization of the separator for various uses by general experiment, without alteration in the general form or arrangement of the separator.

The general theory of the separator of the present invention is to provide areas of relative quiet for the precipitation of entrained particles, by the use of pocket baffles, and to remove such particles beyond the gas stream by which they were entrained before they can be again picked up and carried along.

The device and the method of the present invention may be employed in various other connections as well as in the flue of a furnace. For example, they may be employed in separating and collecting cement dust, grain dust, metallic dust, ore dust, or carbon black from a decomposing furnace. In the latter instance the present invention may be employed with particular advantage because the separator is capable of collecting the carbon black at the relatively high temperature at which it issues from the furnace. It may also be used to secure dust free air in laboratories and the like. In all such uses where the temperature of the gases and the general conditions permit, it may readily be combined with a water curtain, or similar means now in use.

If desired, portions of the separator, or the entire interior thereof may be coated with an adhesive substance to which fine particles will readily adhere.

What we claim is:

1. In a dust and soot separator, a casing having a curved passage for gases to produce a centrifugalizing effect thereon, at least one pocket baffle in said passage, the bottom wall of the passage having an orifice therein adjacent said pocket baffle, and a baffle element comprising a plurality of rows of baffle members at the discharge opening from said passage, the baffle members of adjacent rows being in mutually staggered arrangement.

2. In a dust and soot separator, a casing having a passage for gases therein, at least one pocket baffle in said passage, the bottom wall of the passage having an orifice therein adjacent said pocket baffle, and a baffle element comprising a plurality of rows of baffle members at the discharge opening from said passage, the baffle members of adjacent rows being in mutually staggered arrangement.

3. In a dust and soot separator, a casing having a curved passage for gases to produce a centrifugalizing effect thereon, at least one pocket baffle in said passage, the bottom wall of the passage having an orifice therein adjacent said pocket baffle, and a baffle element comprising a plurality of baffle members at the discharge opening from said passage, said baffles being so positioned with respect to said curved passage as to stand substantially perpendicular to the line of travel of the gases which move from the passage.

4. In a dust and soot separator, a casing having a passage for gases therein, at least one pocket baffle in said passage, the bottom wall of the passage having an orifice therein adjacent said pocket baffle, and a baffle element comprising a plurality of baffle members within the discharge opening from said passage, and said baffles being so positioned with respect to the gas passage of the casing as to stand substantially perpendicular to the line of travel of the gases moving from said passage.

In witness whereof, we hereunto set our hands.

HARRY B. MELLER.
STEHMAN ALBERT BOCKIUS.